United States Patent [19]
Irmscher et al.

[11] 3,900,467
[45] Aug. 19, 1975

[54] PROCESS FOR THE MANUFACTURE OF β-(3-OXO-7α-ACETYLTHIO-17β-HYDROXY 4-ANDROSTENE-17α-YL)-PROPIONIC ACID γ-LACTONE

[75] Inventors: Klaus Irmscher, Darmstadt; Josef Kramer, Seeheim; Herbert Nowak, Darmstadt, all of Germany

[73] Assignee: Hoechst Aktiengesellschaft, Frankfurt am Main, Germany

[22] Filed: July 26, 1973

[21] Appl. No.: 382,661

[30] Foreign Application Priority Data
July 28, 1972 Germany............................ 2237143

[52] U.S. Cl..................... 260/239.55C; 260/239.5; 260/239.57; 260/397.5
[51] Int. Cl.²......................................... C07J 17/00
[58] Field of Search............... 260/239.55 C, 239.57

Primary Examiner—Elbert L. Roberts
Attorney, Agent, or Firm—Curtis, Morris & Safford

[57] ABSTRACT

A process for preparing spironolactone,

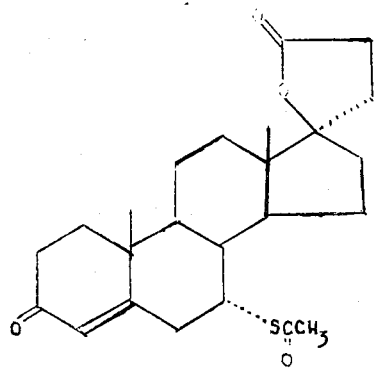

by reacting certain 17-oxo steroids with certain organo-metallic propionaldehyde acetals, semi-thioacetals, or thioacetals to form the corresponding 17β-hydroxy-17α-propionaldehyde acetals, semi-thioacetals, or thioacetals; solvolyzing this product in the presence of an acid to form a cyclic semi-acetal, with simultaneous or subsequent esterification or etherification of any semi-acetal hydroxy group present; dehydrogenating or oxidizing and dehydrogenating the resultant compound to form the corresponding 6-dehydro compound; reacting this compound with thioacetic acid to form a dithioacetate having a 7-thioacetyl group; and oxidizing the other thioacetate group to an oxo group to form spironolactone.

Method of preparing 1-dehydro-spironolactone by chemical or microbiological dehydrogenation of spironolactone.

Certain 17β-hydroxy-17α-propionaldehyde acetals, semi-thioacetals, and thioacetals of the formula

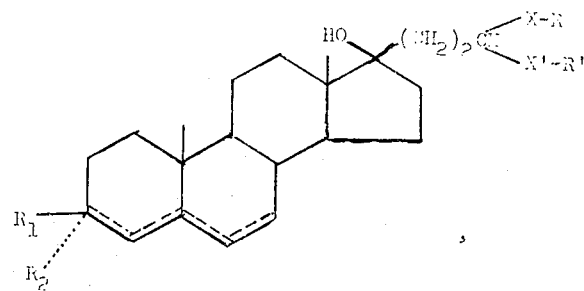

obtained as intermediates, in which X and X' are oxygen or sulfur.

5 Claims, No Drawings

PROCESS FOR THE MANUFACTURE OF β13-OXO-7α-ACETYLTHIO-17 β-HYDROXY 4-ANDROSTENE-17σ-YL)-PROPIONIC ACID-γ-LACTONE

The present invention relates to a process for the manufacture of a spironolactone and a derivative thereof and to certain 17β-17α-propionaldehyde acetals, semi-thioacetals, and thioacetals obtained as intermediates.

It has been found that β-(3-oxo-7α-acetylthio-17β-hydroxy-4-androsten-17α-yl)-propionic acid γ-lactone (spironolactone) and the 1-dehydro derivative thereof, which are known to reduce aldosterone release, can be prepared by a novel advantageous and surprising process.

More in particular, this invention relates to a process for the manufacture of β-(3-oxo-7α-acetylthio-17β-hydroxy-4-androsten-17α-yl)-propionic acid γ-lactone and its 1-dehydro derivative, which comprises reacting 17-oxo steroids of the general formula I

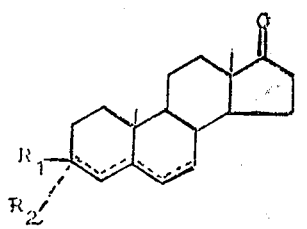

(I)

in which R₁ stands for OH, O-acyl, O-alkyl or O-aryl and R₂ for hydrogen, or in which R₁ and R₂ together stand for an acetal, semithio-acetal, thio-acetal, enamine, enol ester or enol ether radical, with an organometallic derivative formed in situ and corresponding to the formula II

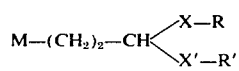

M—(CH₂)₂—CH⟨X—R / X'—R'⟩    (II)

in which X and X' may be identical or different and each stands for an oxygen or sulfur atom, M stands for an alkali metal ion and R and R' may be identical or different and each stands for a hydrocarbon radical of 1 to 20 carbon atoms, preferably 1 to 10 carbon atoms, or R and R' may also be linked to each other to form a ring with the atoms X and X' and the CH group, in which R and R' each preferably contains 2 to 6 carbon atoms. The γ-hydroxy-acetal or semithio-acetal or thio-acetal obtained, of the general formula III

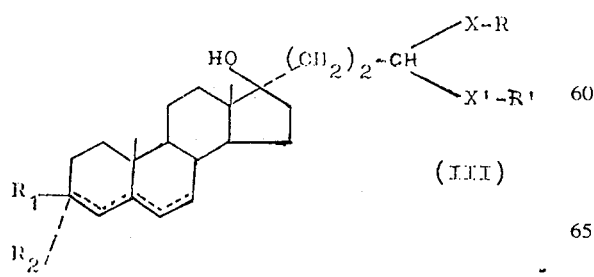

(III)

in which R₁ stands for OH, O-alkyl or O-aryl and R₂ for hydrogen, or R₁ and R₂ together as well as X, X', R and R' are defined as above is solvolyzed according to known methods, with simultaneous or subsequent esterification or etherification of any hydroxy group which is present in the semi-acetal group in the steroid semi-acetals thus obtained. The compounds so obtained, of the formula IV

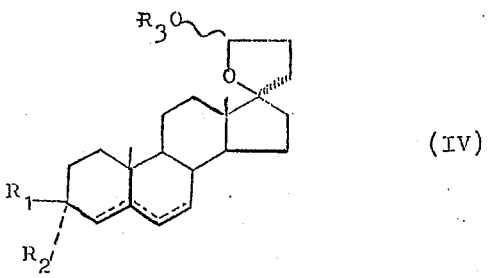

(IV)

in which R₁ is OH and R₂ hydrogen, or R₁ and R₂ each is oxygen, R₃ stands for acyl, acetylthio or alkyl, are converted into the corresponding 6-dehydro derivatives of the general formula V

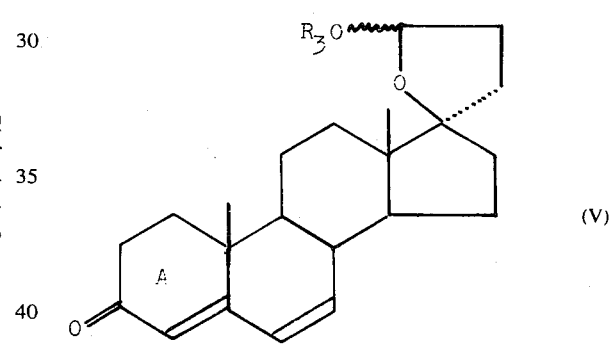

(V)

in which R₃ is defined as above, according to known methods either by usual oxidation of the free 3-hydroxy group and dehydrogenation or — if the 3-oxo group is already present in the nucleus A — only by dehydrogenation. These derivatives are then reacted with thioacetic acid and the dithioacetate obtained, of the formula VI,

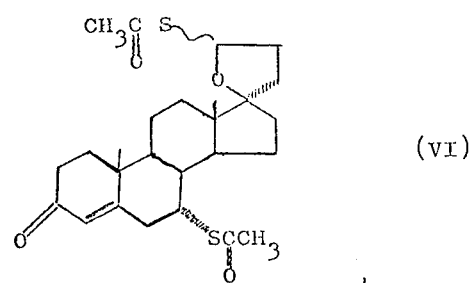

(VI)

is oxidized in an acid solution to yield the corresponding γ-lactone of the formula VII

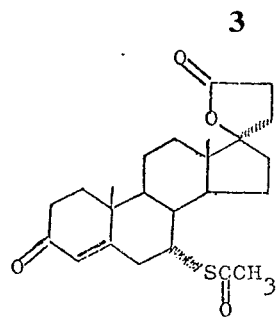

(VII)

A double bond can subsequently be introduced into the 1,2-position by chemical or microbiological dehydrogenation.

In the $\Delta^4$-3-ketones of the above formula I, the position of the double bond(s) in their derivatives is as follows:

in the acetal $\Delta^5$
in the semithio-acetal $\Delta^4$
in the thio-acetal $\Delta^4$
in the enamine $\Delta^{3,5}$
in the enol ester $\Delta^{3,5}$
in the enol ether $\Delta^{3,5}$ In the $\Delta^{4,6}$-dienone derivatives (acetal, semithioacetal and thio-acetal), the position of the double bonds is $\Delta^{4,6}$.

The position of the double bond(s) is analogous in the compounds of the above-cited formula III.

According to a preferred embodiment of the process of the invention, androstenolone is reacted with $\beta$-lithium-propion-aldehyde ethylene acetal formed in situ. The $\gamma$-hydroxyacetal thus obtained is solvolyzed with methanolic hydrochloric acid. The 3-hydroxy group in the intermediate obtained is oxidized according to Oppenauer. The oxo compound is dehydrogenated and thio-acetic acid is added on the $\Delta^{4,6}$-dienone compound obtained. The resulting dithio-acetate is oxidized to yield $\beta$-(3-oxo-7$\alpha$-acetylthio-17$\beta$-hydroxy-4-androsten-17$\alpha$-yl)-propionic acid-$\gamma$-lactone. For the dehydrogenation, chloranil is preferably used and for the oxidation reaction in the last step, a solution of chromium trioxide ($CrO_3$) in acetone or glacial acetic acid is preferably used.

The preferred embodiment of the process of the invention is illustrated by the following formula scheme:

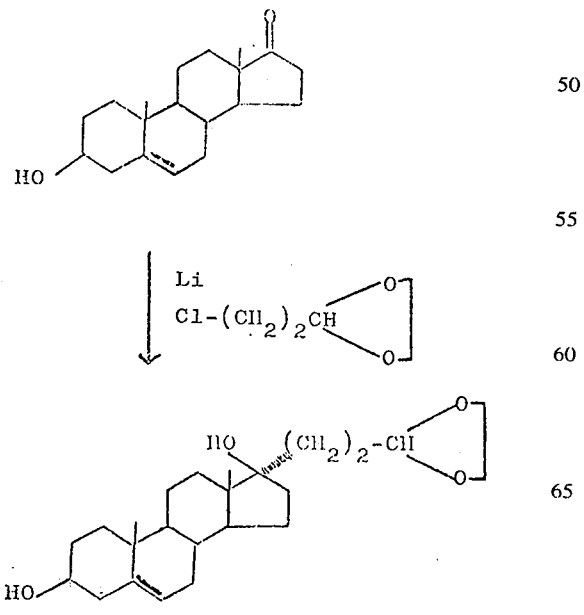

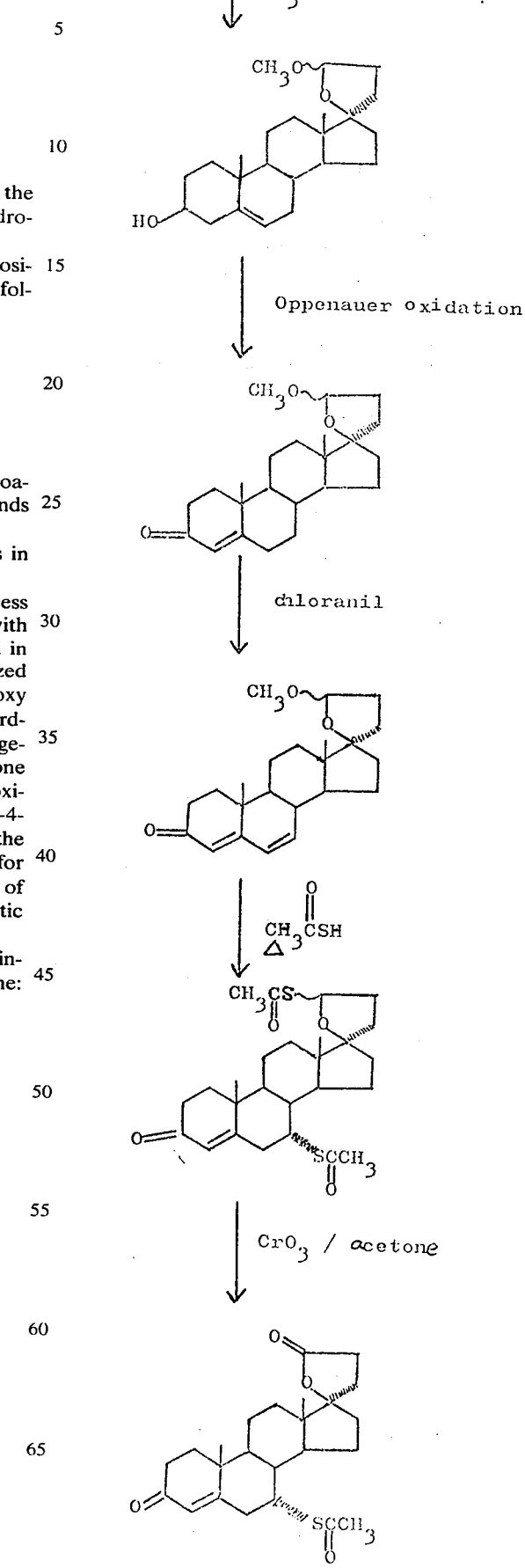

The compounds of formula III are novel and are valuable intermediates also suitable for the manufacture of steroids other than spironolactone.

The first step of the process of the invention is especially surprising. It is known that acetals react with organo-metallic compounds to yield ethers by a substitution at the carbon atom of the acetalized carbonyl group:

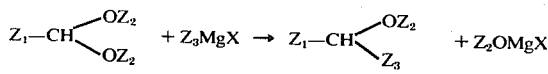

($Z_1$, $Z_2$ and $Z_3$ stand for alkyl groups).

Accordingly, organo-metallic compounds containing acetal groups are not considered to exist nor could they heretofore be used to prepare aldehydes which would permit interesting syntheses. On the contrary, it has been disclosed [cf. Bull. Soc. Chim. France, series 5, 2, 2143 (1935)] that $\beta$-chloropropionaldehyde dimethyl acetal reacts with methyl magnesium bromide in the manner usual for acetals to yield 1-chloro-3-methoxybutane:

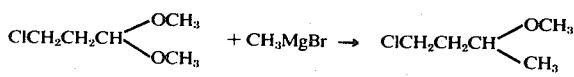

One would accordingly expect that, in trying to convert a halogenated aldehyde acetal into the corresponding organo-metallic compound, this would react with itself to yield high-molecular-weight products. This expectancy could be confirmed by experiment: when lithium is reacted with $\beta$-bromopropion-aldehyde ethylene acetal in ether under the conditions usual for the formation of organo-lithium compounds, the metal surface is covered with a yellow precipitate even at low temperatures and the reaction comes to a standstill. No organically bound lithium can be established in the solution.

It has been found that organo-metallic compounds can be prepared from $\omega$-halogenopropionaldehyde acetals and can be used for the reaction with steroid carbonyl compounds by introducing the carbonyl compound together with the metal into a solvent and gradually adding the $\omega$-halogenated acetal, whereupon the organo-metallic compound formed in situ reacts immediately with the carbonyl compound and is thus prevented from reacting with itself.

Such a mode of operation is not usual nor obvious for organo-metal reactions. In such a reaction, for example a Grignard reaction or an organo-lithium reaction, the metal is always placed in a solvent and the halogenated compound to be reacted is first added and then the reaction between the two component is completed, whereupon excess metal, if any, is separated. Only then is the organo-metallic compound reacted with the carbonyl compound, in many cases only after the content of the solution containing the organo-metallic compound has been determined.

Following the first step of the process of the invention, two kinds of trouble would be expected. The one is that a reaction of a metal with an organic halogenated compound is often difficult to start. In the presence of the carbonyl compound, starting the reaction is expected to be even more difficult owing to a further dilution of the reaction components. It was, on the other hand, not to be foreseen that a metal, especially an alkali metal, and an oxo steroid could be introduced together into a solvent without reacting with each other. It is, for example, known that oxo steroids can be reduced by means of alkali metals in inert solvents, such as liquid ammonia, to yield steroid alcohols. For those oxo steroids containing hydroxy groups, formation of alcoholates was moreover expected.

Hence, it is surprising that the first process step afforded yields of up to 90 per cent of the theoretical yield.

The structure of the radicals $R_1$ and $R_2$ is of subordinate importance in carrying out the first step of the process, since these (with the exception of $R_1$ being OH and $R_2$ being H) merely have the functions of protective groups normally used in steroid chemistry for the 3-hydro and 3-oxo groups and are split off in the course of the process.

Suitable starting steroids are, for example, 4-androstene-3,17-dione, 3-pyrrolidino-3,5-androstadiene-17-one, 3-piperidino-3,5-androstadiene-17-one, 3-morpholino-3,5-androstadiene-17-one, 3-ethylene-dioxy-5-androstene-17-one, 3-ethylene-dithio-5-androstene-17-one, 5-androstene-3,17-dione-3-mono-ethylene semithio acetal, 3-ethoxy-3,5-androstadiene-17-one, 3-acetoxy-3,5-androstadiene-17-one, 5-androstene-3$\beta$-ol-17-one (androstenolone), 5-androstene-3$\beta$-ol-17-one 3-acetate (androstenolone acetate) and 5-androstene-3$\beta$-ol-17-one-3-tetrahydropyranyl ether.

Acyloxy groups, if any, may be hydrolyzed in the course of the reaction.

The following halogenated acetals of the formula

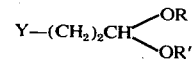

in which Y stands for chlorine, iodine or bromine and R and R' are defined as above, are mentioned, above all, as starting substances: $\beta$-chloropropionaldehyde dimethyl acetal, -diethyl acetal, -ethylene acetal; $\beta$-bromopropionaldehyde dimethyl acetal, -diethyl acetal and -ethylene acetal.

Likewise suitable as starting compounds are the following thioacetals and their corresponding semithio-acetals: $\beta$-chloropropionaldehyde dimethyl thioacetal, -diethyl thioacetal, -ethylene thioacetal; $\beta$-bromopropionaldehyde dimethyl thioacetal, -diethyl thioacetal and -ethylene thioacetal.

The radicals R and R', which are not present in the final product obtained by the process, may be varied within wide limits and may, for example, have the following meanings: n-propyl, isopropyl, n-butyl, isobutyl, n-amyl, isoamyl, hexyl, cyclohexyl, decyl, phenyl, benzyl; together they may also stand for an ethylene, trimethylene, tetramethylene, propylene-(1,2) or phenylene-(1,2) group.

The reaction is generally carried out by dissolving the starting steroid, under nitrogen, in a solvent, adding the alkali metal, especially sodium or potassium, preferably lithium, in the form of chips, scales, powder or granules and then adding the halogenated acetal or thioacetal, which may also be dissolved in a solvent, portionwise or dropwise. As solvents, there may be mentioned all the solvents usual for organo-metallic reactions, preferably the aliphatic and cycloaliphatic ethers such as diethyl ether, diisopropyl ether, tetrahydrofuran, and dioxan, but also anisole, benzene, and toluene, or mixtures of these solvents with each other. The reaction temperatures range from −100°C to the boiling point of the solvent used, preferably from about −60° to +5°C. The reaction is then completed by allowing the reaction mixture to come to room temperature or by heating or boiling it.

Depending on the starting compound chosen and on the temperatures applied, the reaction period ranges from about 5 minutes to 24 hours, generally from about half an hour to 3 hours. In many cases, it is recommended to use the halogenated acetal in an excess of up to 10 mols. The reaction solution is preferably worked up by stirring it into ice water. It is, of course, also possible to use solutions of salts, for example of ammonium chloride, or dilute aqueous acids. In all these cases, it is advantageous to operate with cooling. The reaction products are isolated in the usual manner from the reaction mixture, for example by filtration or extraction.

The γ-hydroxy-acetals or — semithio-acetals or -thioacetals obtained as primary products are then solvolyzed according to known methods to yield cyclic steroid semi-acetals. The hydrolysis is carried out in the presence of acid catalysts, such as inorganic acids, for example hydrochloric acid, sulfuric acid, perchloric acid, selenium dioxide; sulfonic acids, for example p-toluene-sulfonic acid; carboxylic acids, for example oxalic acid, citric acid or formic acid, and in the presence of a solvent, such as acetone, tetrahydrofuran, dioxan, or diethylene-glycol dimethyl ether. It is easily possible to carry out the solvolysis under such conditions as permit protected oxo groups to be set free, for example those which are protected in the form of an acetal, an enol ether or an enamine. When halogenated semithio-acetals or thio-acetals are used as starting compounds, the solvolysis of the γ-hydroxy-semithioacetals or -thioacetals obtained as primary products may be performed according to all the methods usual for thio-acetals. For example, the product may be hydrolyzed with an acid or also under non-acid conditions with the aid of mercury-(II) compounds, preferably of mercury dichloride, where required in the presence of a proton acceptor such as cadmium carbonate.

The steroid semi-acetals formed by solvolysis are generally available in their cyclic form and not as γ-hydroxy-aldehydes and may be illustrated by the formula

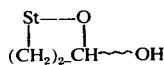

in which St stands for the steroid radical. The hydroxy group therein may be in α- or β-position. In some cases, the reaction yield both isomers which can, if desired, be separated by usual methods, such as crystallization or chromatography.

According to the invention, it is also possible to etherify or esterify any free hydroxy group of the acetal radical in the reaction products in known manner. For example, etherification may be brought about by a reaction with alkylating agents, such as alcohols in the presence of acids, with alkyl-halides or sulfates, or in such a manner that the steroid semi-acetals are not isolated as such but etherification or esterification are performed in the same reaction medium after a suitable choice of the solvolysis medium. For example, the γ-hydroxy-acetal (III) obtained above may be treated with one of the above acids in the presence of an alcohol, such as methanol or ethanol, and the corresponding alkyl ether (IV) may directly be isolated from the reaction mixture.

In these alkyl glycosides, the alkyl group may have 1 to 5 carbon atoms and preferably is methyl, ethyl, n-propyl, isopropyl, n-butyl, isobutyl, sec.-butyl, tert.-butyl, n-amyl or isoamyl.

As esterification agents, there are suitable all the alkane-carboxylic acids having 1 to 12 carbon atoms or the derivatives thereof suitable for esterification, and also cycloaliphatic and aromatic acids. Suitable acid derivatives, in addition to the free acids, are, for example, the halides, anhydrides, thiol derivatives and ketenes thereof. For transesterification purposes, lower alkyl esters are also suitable.

In fact, however, the radical $R_3$ in formula IV is not significant since it is split off during the process and does not appear in the final product.

It is furthermore possible to set free any etherified or esterified hydroxy groups of the semi-acetal group in a usual manner, for example, as disclosed above, by isolating the corresponding methyl ethers and treating these with dilute hydrochloric acid (in water/dioxan).

The preparation of some steroid semi-acetals has been disclosed in French Patent No. 1,334,968. Compared to this patent, the process of this invention (I – IV) has a number of advantages: it comprises a smaller number of reaction steps and offers a wider field of applications. It may, for example, also be carried out in the presence of glycol groups.

The compounds of the general formula IV, as well as those of the following steps, for example V and VI, are obtained in the form of a mixture of diastereoisomers, which is not sufficiently crystallizable since a new asymmetric carbon atom is present in the cyclic semi-acetal. To avoid losses in yield, no crystallized products are generally isolated but the corresponding crude products are isolated instead.

The compounds of the general formula V are prepared from the compounds of the general formula IV according to known methods either by means of the usual oxidation of the free 3-hydroxy groups in an alkaline or neutral to weakly acid medium and subsequent dehydrogenation, for example with chloranil, or, if a free oxo group is already present in nucleus A, only by means of dehydrogenation, for example with chloranil, or, if the 3-oxo group in nucleus A is present as an enol ether (for example of the 3-ethoxy-3,5-androstadiene type), also by means of direct dehydrogenation, for example with chloranil or with 2,3-dichloro-5,6-dicyano-1,4-benzoquinone, to yield the corresponding 6-dehydro derivatives of formula V.

For the oxidation of a free 3-hydroxy group, there may be chosen the known methods according to Oppenauer (for example a reaction with aluminum isopropylate/cyclohexanone/toluene) and according to Sarett (for example $CrO_3$/pyridine), as they are disclosed in "Steroid Reactions" by Carl Djerassi, Holden-Day Inc., San Francisco 1963, page 89 et seq.

The $\Delta^4$-3-ketone structure or the enol ethers of the corresponding Δ⁴-3-ketones are dehydrogenated to yield the corresponding 6-dehydro derivatives also according to known methods (cf. "Steroid Reactions" by Carl Djerassi, Holden-Day Inc. San Francisco 1963, pages 227 et seq.), using chloranil or 2,3-dichloro-5,6-dicyano-1,4-benzoquinone in a solvent, such as tert.-butanol, methanol, xylene, benzene, toluene, dioxan, amyl alcohol, or ethyl acetate, preferably a boiling solvent. The reaction solvent is preferably worked up by chromatography on aluminum oxide, but it may, of course, also be worked up by stirring it into water and then extracting it with the same or a different solvent, and finally purifying the crude product in suitable manner after isolation.

The dithio-acetate of formula VI is prepared from the compounds of the general formula V by heating the steroid in thio-acetic acid as a solvent, preferably to boiling temperature.

According to the invention, the dithio-acetate(VI) thus obtained is then oxidized in an acid solution while the thio-acetyl group in the cyclo-semiacetal is split off to yield spironolactone of the formula VII.

It could not be expected that the oxidation yielding the β-(3-oxo-7α-acetylthio-17β-hydroxy-4-androsten-17α-yl)-propionic acid γ-lactone of the formula VII would be possible in an acid medium since these conditions are considered to eliminate thio-acetic acid in 7α-position. Since Δ⁴-3-oxo steroids are usually enolized under the action of protons and the acetyl group linked to the allyl group in the enol thus formed can very easily be eliminated, it was more probable to assume a formation of the 3-oxo-4,6-diene system according to the following reaction mechanism, the thio-acetic acid being split off:

case of 7α-acetylthio compounds and of 7α-hydroxy compounds to give 3-oxo-4,6-diene. In the present case, however, the acetylthio group in 7α-position is surprisingly left untouched.

The oxidation reaction may generally be carried out using all the oxidation agents which, in an acid solution, oxidize aldehydes to acids or cyclo-semiacetals to lactones. Especially advantageous oxidants are chromium trioxide in an acid solution, especially in lower alkanecarboxylic acids such as acetic acid, propionic acid or butyric acid as a solvent, or chromium sulfuric acid in acetone.

Further oxidants to be used for the reaction are, for example, nitric acid or nitrous acid or nitrogen oxides, especially dinitrogen tetroxide, and; hypohalites, especially HOBr, HOCl or N-bromo-succinimide or N-chloro-succinimide in an acid solution. An acid permanganate solution may also be used, especially a potassium permanganate solution in sulfuric acid, or peracids, for example peracetic acid, perbenzoic acid, m-chloro-perbenzoic acid or perphthalic acid.

The oxidation reaction is generally carried out in inert organic solvents such as glacial acetic acid, acetic anhydride, acetone, dioxan, tetrahydrofuran, an dimethyl-sulfoxide, or in chlorinated hydrocarbons such as methylene chloride, chloroform or carbon tetrachloride, presence of water where required. An addition of water is of special advantage when nitric acid, nitrous acid or permanganates are used as oxidants.

The reaction temperatures generally range from 0° to 80°C and the reaction periods range from 10 minutes to 48 hours, depending on the oxidant and the temperature chosen. The crude products obtained after the usual extraction are then purified by chromatography.

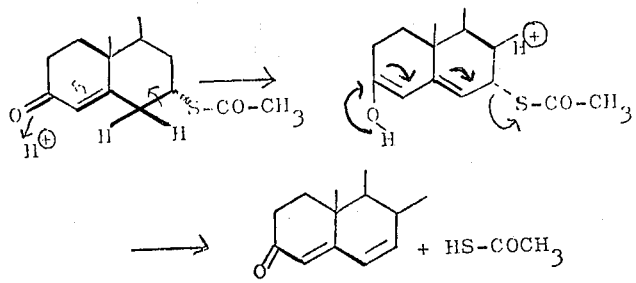

Surprisingly, however, the thioacetyl group is not split off during the oxidation according to the process of the invention. This was the more unlikely to be assumed since substituents linked by a hetero atom in the 7α-position of a 3-oxo-4-ene steroid generally show little stability. For example, a 7α-acetoxy group in such a steroid is, as experience has shown, so unstable that it is often eliminated already under the mildest conditions, for example of a chromatography on alkali-free aluminum oxide, to yield the corresponding 3-oxo-4,6-diene [cf. Helvetica Chimica. Acta, 38, 387 (1955)]. It is known that a 7α-hydroxy group of a 3-oxo-4-ene steroid is very easily split off both in an acid medium and in an alkaline medium, while water is eliminated and a double bond is formed inthe 6,7-position.

Since 7α-acetylthio-Δ⁴-3-oxo-steroids are known to split off thio-acetic acid in an alkaline medium to yield the corresponding 3-oxo-4,6-diene [cf. Journal of Organic Chemistry, 26, 3922 (1961)], a reaction in an acid medium was also expected to be analogous in the Dehydrogenation of the 1,2-position of β-(3-oxo-7α-acetylthio-17β-hydroxy-4-androsten-17α-yl)-propionic acid γ-lactone may be carried out by chemical or microbiological methods. Suitable dehydrogenating agents are, especially, 2,3-dichloro-5,6-dicyano-benzoquinone or selenium dioxide. When 2,3-dichloro-5,6-dicyano-benzoquinone is used, dehydrogenation is advantageously carried out in the presence of a solvent having a boiling point of about 30° to 150°C, for example ethanol, butanol, tert.-butanol, tert.-butylacetic acid methyl ester, methyl acetate, dioxan, glacial acetic acid, benzene, tetrahydrofuran, or acetone. It is advantageous to add small amounts of nitrobenzene to the reaction mixture. The reaction period ranges from 5 to 48 hours, depending on the solvent used and the starting material chosen. The reaction is advantageously carried out at the boiling temperature of the solvent used.

When selenium dioxide is used as a dehydrogenating agent, tertiary butanol, ethyl acetate or tert.-amyl alcohol are suitable as solvents. The reaction may be accelerated by adding minor amounts of glacial acetic acid. Good yields are obtained by refluxing the reaction mixture. The reaction is complete after about 12 to 48 hours. The precipitated selenium is separated and the 1,2-dehydrogenation product obtained is isolated from the filtrate.

Microbiological 1,2-dehydrogenation may be carried out using microorganismus, for example of the following species: Alternaria, Calonectria, Colletrotrichum, Cylindrocarpon, Didymella, Fusarium, Ophiobolus, Septomyxa, Vermicularia; Micromonospora, Nocardia, Streptomyces; Alcaligenes, Bacillus, Corynebacterium, Myconacterium, Protaminobacter, and Pseudomonas. Especially suitable are *Bacillus sphaericus* var. *fusiformis*, *Corynebacterium simplex* and *Fusarium solani*.

For dehydrogenation purposes, the starting material is added to a submersed culture of the microorganism used, which is cultivated in a suitable nutrient solution at an optimum temperature and with vigorous aeration according to the usual fermenting techniques. Instead of growing cultures, suspensions of the microorganisms in buffer solutions may also be used according to the same technique. The reaction is controlled by chromatography and, after complete reaction of the starting material, the fermenting solution is extracted, for example with chloroform.

Compared to the known process for the manufacture of spironolactone [cf. Ehrhart/Ruschig "Arzneimittel, 953, 1000 (1968)], the process of the present invention has the advantage of reducing the number of steps for its preparation, dispensing with the use of acetylene which is difficult and dangerous to handle and moreover producing spironolactone in better yields.

The following Examples illustrate the invention.

EXAMPLE 1 a. 5.6 Liters of tetrahydrofuran were introduced into an apparatus provided with a stirrer. 225 g of androstenolone were dissolved therein and 56.2 g of lithium which had been cut into small pieces were added. The mixture was cooled to 0°C. Then, while nitrogen was fed in, a solution of 425 g of β-chloropropionaldehyde ethylene acetal in 560 ml of tetrahydrofuran was added dropwise within 1 hour. Stirring was continued for 3.5 hours at 0°C and then for 9 hours at room temperature. The mixture was stirred into 25 l of ice water. The precipitate obtained was suction-filtered, washed with water on the filter and dried.

The crude product was recrystallized from 2.2 l of acetone. Yield: 172 g of β-(3β, 17β-dihydroxy-5-androstene-17αyl)-propionaldehyde ethylene acetal. Melting point 180° – 182°C.

b. A solution of 25 g of finely cut lithium metal in 2.5 l of absolute tetrahydrofuran was combined with 100 g of androstenolone and the mixture was cooled to −50°C. At this temperature, a solution of 250 g of β-bromopropionaldehyde ethylene acetal in 250 ml of absolute tetrahydrofuran was added dropwise within 1 hour under a protective atmosphere of $CaCl_2$—$N_2$. Stirring was continued for 1 hour at −50°C, then for 20 minutes without cooling. The lithium metal was separated through glass wool under nitrogen pressure and stored in a vessel. The mixture was then poured into 12 l of a mixture of ice and water. The precipitate was suction-filtered, washed until neutral and dried in vacuo. The precipitate was then recrystallized from acetone.

Yield: 83 g of β-(3β, 17β-dihydroxy-5-androstene-17α-yl)-propionaldehyde ethylene acetal, m.p. 180° – 182°C.

c. In a manner analogous to (a), 40 g of androstenolone were reacted with β-bromopropionaldehyde ethylene acetal to yield 38.3 g of β-(3β, 17β-dihydroxy-5-androstene-17α-yl)-propionaldehyde ethylene acetal. M.p. 180° – 182°C (from acetone); $(\alpha)_D^{20}$ −66° ($CHCl_3$).

EXAMPLE 2

In the manner disclosed in Example 1 (a), 20 g of androstenolone were reacted with β-chloropropionaldehyde diethylmercaptal to yield 12 g of β-(3β, 17β-dihydroxy-5-androstene-17α-yl)-propionaldehyde diethyl mercaptal. Double melting point: 67° – 72°C and 102° – 110°C (from acetone).

EXAMPLE 3

In the manner disclosed in Example 1 (a), 5 g of 3-pyrrolidino-3,5-androstadiene-17-one were reacted with β-bromopropionaldehyde-dimethyl acetal to yield 4.8 g of β-(3-pyrrolidino-17β-hydroxy-3,5-androstadiene-17α-yl)-propionaldehyde dimethyl acetal.

EXAMPLE 4

According to the method disclosed in Example 1 (a), 5 g of 3-ethylene-dioxy-4,6-androstadiene-17-one were reacted to yield 3.4 g of β-(3-ethylene-dioxy-17β-hydroxy-4,6-androstadiene-17α-yl)-propionaldehyde ethylene acetal.

EXAMPLE 5

In a manner analogous to Example 1 (b), 5 g of 3-ethoxy-3,5-androstadiene-17-one were reacted to yield 2.5 g of β-(3-ethoxy-17β-hydroxy-3,5-androstadiene-17α-yl)-propionaldehyde ethylene acetal.

EXAMPLE 6

1 g of β-(3β, 17β-dihydroxy-5-androstene-17α-yl)-propionaldehyde ethylene acetal was suspended in 31 g of methanol and the suspension was cooled to 0°C. 4.2 ml of concentrated hydrochloric acid were then added and the mixture was shaken for 4 minutes. The limpid solution was poured into 300 ml of water and then extracted with chloroform. The extract was washed with water, dried and evaporated to dryness. The β-(3β, 17β-dihydroxy-5-androstene-17α-yl)-propionaldehyde-cyclo-semiacetal methyl glycoside formed was recrystallized from methanol (m.p. 100° – 114°C, subject to change depending on purity), or it was further used as a crude product.

EXAMPLE 7

In a manner analogous to Example 6, 2 g of β-(3-pyrrolidino-17β-hydroxy-3,5-androstadiene-17α-yl)-propionaldehyde dimethyl acetal were reacted with methanolic hydrochloric acid at the boil. After recrystallization from ether, 1.2 g of β-(3-oxo-17β-hydroxy-4-androstene-17α-yl)-propionaldehyde cyclo-semiacetal methyl glycoside were obtained, m.p. 108° – 110°C;

$(\alpha)_D^{20}$ + 91° (chloroform);
$\lambda_{max}$ = 241 mμ; $E_{1\ cm}^{1\ \%}$ 469.

EXAMPLE 8

0.5 g of β-(3β, 17β-dihydroxy-5-androstene-17α-yl)-propionaldehyde ethylene acetal was dissolved in 8 ml of dioxan and 8 ml of methanol. 2 ml of concentrated hydrochloric acid were added and the mixture was allowed to stand for 40 minutes at room temperature. Working-up as in Example 6 gave 280 mg of β-(3β, 17-β-dihydroxy-5-androstene-17α-yl)-propionaldehyde cyclo-semiacetal methyl glycoside, m.p. 98° – 112°C.

EXAMPLE 9

500 mg of β-(3β, 17β-dihydroxy-5-androstene-17α-yl)-propionaldehyde ethylene acetal were dissolved in 20 ml of methanol. 25 mg of oxalic acid were added and the mixture was refluxed for 2.5 hours. Working-up as in Example 6 gave β-(3β, 17β-dihydroxy-5-androstene-17α-yl)-propionaldehyde cyclo-semiacetal methyl glycoside, m.m. 98° – 107°C.

EXAMPLE 10

25 mg of oxalic acid were added to a solution of 500 mg of β-(3β, 17β-dihydroxy-5-androstene-17α-yl)-propionaldehyde ethylene acetal in 20 ml of methanol and 10 ml of dioxan. The mixture was refluxed for 27 hours. Working-up as in Example 6 resulted in 160 mg of β-(3β, 17β-dihydroxy-5-androstene-17α-yl)-propion-aldehyde cyclo-semiacetal methyl glycoside, m.p. 106° – 120°C.

EXAMPLE 11

25 mg of p-toluene-sulfonic acid were added to a suspension of 500 mg of β-(3β, 17β-dihydroxy-5-androstene-17α-yl)-propionaldehyde ethylene acetal in 20 ml of methanol and the suspension was stirred for 1 hour at room temperature. As in Example 6, the reaction mixture was worked up and the crude product was chromatographed on 30 g of basic aluminum oxide. The β-(3β, 17β-dihydroxy-5-androstene-17α-yl)-propionaldehyde cyclo-semiacetal methyl glycoside was eluted with benzene/chloroform (9 : 1) and recrystallized from methanol. M.p. 93° – 101°C.

EXAMPLE 12

25 mg of selenium dioxide were added to 500 mg of β-(3β, 17β-dihydroxy-5-androstene-17α-yl)-propionaldehyde ethylene acetal in 20 ml of methanol, and the mixture was refluxed for 27 hours. After work-up and chromatography as in the above Example, 90 mg of β-(3β, 17β-dihydroxy-5-androstene-17α-yl)-propionaldehyde cyclo-semiacetal methyl glycoside were obtained, m.p. 105° – 113°C.

EXAMPLE 13

2 g of β-(3-pyrrolidino-17β-hydroxy-3,5-androstadiene-17α-yl)-propionaldehyde dimethyl acetal were dissolved in absolute dioxan and 35 ml of 10 % hydrochloric acid were added. The mixture was boiled for 3 hours. Recrystallization of the β-(3-oxo-17β-hydroxy-4-androstene-17α-yl)-propionaldehyde cyclo-semiacetal was from ether. Double melting point:

161° – 190°C
$(\alpha)_D^{20}$ + 30° in dioxan;
$\lambda_{max}$.241 mμ; $E_{1\ cm}^{1\ \%}$ 470

EXAMPLE 14

In a manner analogous to Example 13, 3 g of β-(3-ethylene-dioxy-17β-hydroxy-4,6-androstadiene-17α-yl)-propionaldehyde ethylene acetal were reacted at the boiling point to yield 2.1 g of β-(3-oxo-17β-hydroxy-4,6-androstadiene-17α-yl)-propionaldehyde cyclo-semiacetal.

Recrystallization from ether/petroleum ether: melting point 163° – 165°C;
$(\alpha)_D^{20}$ + 1° (chloroform)
$\lambda_{max}$. 283.5 mμ; $E_{1\ cm}^{1\ \%}$ 731.

EXAMPLE 15

2.5 ml of pyridine and 2.5 ml of acetic anhydride were added to 500 mg of β-(3-oxo-17β-hydroxy-4-androstene-17α-yl)-propionaldehyde cyclo-semiacetal and the mixture was stirred for 16 hours at 25°C. It was then poured onto 50 ml of water and extracted with methylene chloride. The extract was shaken twice with 20 ml portions of a saturated sodium chloride solution, dried over sodium sulfate, filtered, and evaporated to dryness at 50°C in vacuo. 400 mg of 3-(3'-oxo-17'β-hydroxy-4'-androstene-17'α-yl)-propionaldehyde cyclo-semiacetal 1-acetate were obtained as an amorphous residue.

IR.: Acetate bands between 1220 – 1270 $cm^{-1}$; no bands at 3400 $cm^{-1}$ (lactol —OH)

EXAMPLE 16

175 g of β-(3β, 17β-dihydroxy-5-androstene-17α-yl)-propionaldehyde cyclo-semiacetal methyl glycoside were dissolved in 4 l of benzene. To remove water, if any, 400 ml were distilled off from the solution, 1.4 l of acetone and then 180 g of aluminum tert.-butylate were added and the mixture was refluxed for 10 hours. A solution of 180 ml of acetic acid in 1.4 l of water was then added to the mixture and stirring was continued for 30 minutes. The mixture was allowed to settle and the aqueous layer was separated in a separating funnel. The benzene phase was then washed three times with water, dried and concentrated to yield a residue. The amorphous crude product, namely β-(3-oxo-17β-hydroxy-4-androstene-17α-yl)-propionaldehyde cyclo-semiacetal methyl glycoside, was used for dehydrogenation (Example 17) without further purification.
UV: $\lambda_{max}$. = 240 mμ ($CH_3OH$), E≈15,000.

EXAMPLE 17

181 g of β-(3-oxo-17β-hydroxy-4-androstene-17α-yl)-propionaldehyde cyclo-semiacetal methyl glycoside obtained according to Example 16 and 149 g of chloranil in 7.8 l of methanol were refluxed for 2.5 hours. The solvent was then distilled off in vacuo. The evaporation residue was taken up in benzene and passed through a column packed with 3.6 kg of aluminum oxide. The column was eluted with benzene while changing the packing several times, especially at the beginning. The individual eluate fractions were examined by thin layer chromatography. The steroid-containing fractions were then combined and concentrated to yield a residue. The so-obtained crude residue of β-(3-oxo-17β-hydroxy-4,6-androstadiene-17α-yl)-propionaldehyde cyclo-semiacetal methyl glycoside was used without further purification for the manufacture of 3-(3'-oxo-7'α-thioacetyl-17'β-hydroxy-4'- androstene-17'α-yl)-propionaldehyde cyclo-semiacetal 1-thioacetate (Example 18).
UV: $\lambda_{max.} = 285$ mμ (CH$_3$OH), E≈19,000.

EXAMPLE 18

115 g of β-(3-oxo-17β-hydroxy-4,6-androstadiene-17α-yl)-propionaldehyde cyclo-semiacetal methyl glycoside and 782 g of thioacetic acid were refluxed together for 30 minutes. The excess thioacetic acid was distilled off in vacuo and the residue obtained after evaporation was freed from thioacetic acid as far as possible by allowing it to stand in vacuo. The amorphous residue of 3-(3'-oxo-7'α-thioacetyl-17'β-hydroxy-4'-androstene-17'α-yl)-propionaldehyde cyclo-semiacetal 1-thioacetate was used without further purification for the oxidation of Example 20.
Yield: 142 g
UV: $\lambda_{max.} = 238 - 240$ mμ (CH$_3$OH), E≈17,000
IR: 1090 – 1140 cm$^{-1}$

EXAMPLE 19

0.4 ml of thioacetic acid was added to 400 mg of 3-(3'-oxo-17'β-hydroxy-4'-androstene-17'α-yl)-propionaldehyde cyclosemiacetal 1-acetate and the mixture was stirred for 4 hours at room temperature. The reaction mixture was poured into 20 ml of an aqueous sodium bicarbonate solution and extracted with methylene chloride. The extract was washed with a saturated sodium chloride solution, dried over sodium sulfate and evaporated to dryness at 50°C in vacuo. 400 mg of amorphous 3-(3'-oxo-7'α-thioacetyl-17'β-hydroxy-4'-androstene-17'α-yl)-propionaldehyde cyclo-semiacetal 1-thioacetate were obtained.

EXAMPLE 20

1 g of 3-(3'-oxo-7'α-acetylthio-17'β-hydroxy-4'-androstene-17'α-yl)-propionaldehyde cyclo-semiacetal 1-thioacetal was dissolved in 40 ml of acetone and, while stirring, a solution of 0.7 g of chromium trioxide in 0.78 ml of concentrated sulfuric acid and 2 ml of water was added dropwise at 10°C. After stirring had been continued for 1 hour at room temperature, the same amount of chromium trioxide solution was once more added dropwise. Stirring was continued for another hour and the solution was poured in 350 ml of water. The β-(3-oxo-7α-acetylthio-17β-hydroxy-4-androstene-17α-yl)-propionic acid γ-lactone was separated by filtration and purified by chromatography on 25 g of silica gel (elution with benzene/chloroform 7 : 3) and recrystallization from ether.
M.p. 208° – 209°C;
$\lambda_{max.} = 237.5$ mμ; $E_{1\ cm}^{1\ \%}$ 493.
Yield: 250 mg.

EXAMPLE 21

2.76 g of β-(3-oxo-7α-acetylthio-17β-hydroxy-4-androstene-17α-yl)-propionic acid γ-lactone were refluxed for 8 hours in 110 ml of dioxan with 2.91 g of 2,3-dichloro-5,6-dicyano-p-benzoquinone. The mixture was worked up using chloroform and water and the crude product was chromatographed on 120 g of silica gel. A 1 : 2 mixture of benzene/chloroform was used to elute the β-(3-oxo-7α-acetylthio-17β-hydroxy-1,4-androstadiene-17α-yl)-propionic acid γ-lactone and the product obtained was recrystallized from benzene/petroleum ether. Double melting point: 133° and 196°C;
$(\alpha)_D^{22} - 32°$ (chloroform);
$\lambda_{max.} = 239$ mμ; $E_{1\ cm}^{1\ \%}$ 410.

We claim:

1. A process for making β-(3-oxo-7α-acetylthio-17β-hydroxy-4-androstene-17α-yl)-propionic acid γ-lactone which comprises
reacting a 17-oxo-steroid of the formula

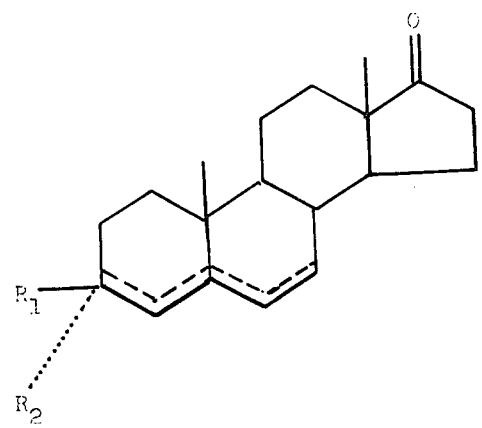

wherein the dashed lines represent a Δ$^{3,5}$-, Δ$^5$-, or Δ$^{4,6}$-unsaturation and wherein R$_1$, taken alone, is —OH, and R$_2$, taken alone, is hydrogen, or in which R$_1$ and R$_2$, taken together define an acetal, enamine, or enol ether group, with an organometallic compound, formed in situ, of the formula

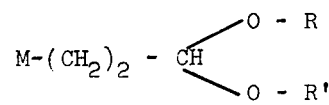

wherein M is an alkali metal, R and R', taken alone, are the same or different and are a hydrocarbon having 1 to 20 carbon atoms, and R and R', taken together, are a hydrocarbon having 2 to 6 carbon atoms and are joined with the

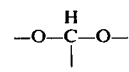

group to form a ring, whereby a γ-hydroxy-acetal of the formula

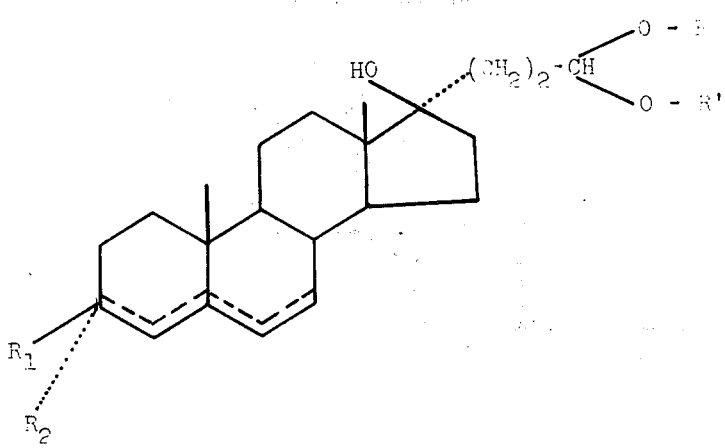

is formed, wherein $R_1$, $R_2$, R, and R' are as earlier defined;

solvolyzing this γ-hydroxy-acetal with an acid and esterifying or etherifying the hydroxy group present in the semi-acetal group of the semi-acetal so formed, whereby a compound of the formula

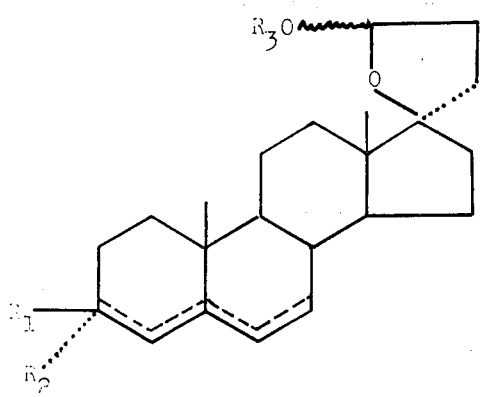

is obtained, wherein $R_1$, taken alone, is —OH, $R_2$, taken alone, is hydrogen, $R_1$ and $R_2$, taken together, define an oxo group, and $R_3$ is acyl or alkyl;

oxidizing the 3-OH group and dehydrogenating the resultant compound in the 6-position if $R_1$ is —OH, or only dehydrogenating the resulting compound in the 6-position if $R_1$ and $R_2$ together define a 3-oxo group, whereby a 3-oxo-6-dehydro compound of the formula

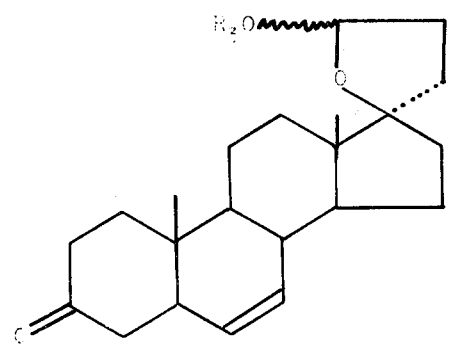

is formed;

reacting the 3-oxo-6-dehydro compound with thioacetic acid, whereby a dithioacetate of the formula

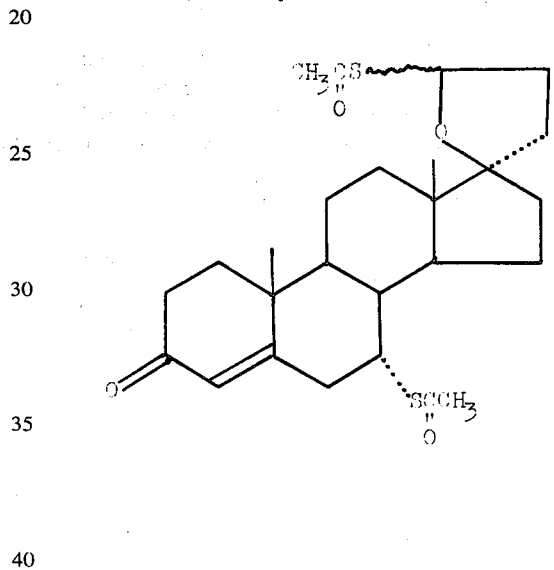

is formed;

and oxidizing the dithioacetate under acid conditions to form the corresponding γ-lactone,

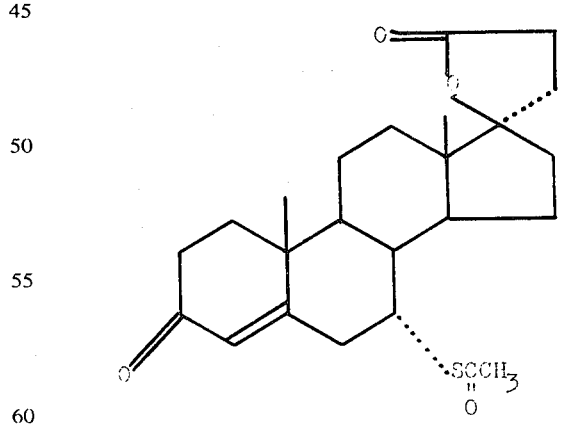

2. A process as claimed in claim 1, wherein androstenolone is reacted with β-lithium propionaldehyde ethylene acetal formed in situ, the γ-hydroxy acetal thus obtained is solvolyzed with methanolic hydrochloric acid, the 3-hydroxy group in the intermediate product obtained is oxidized according to the Oppenauer method, the oxo compound is dehydrogenated, thioacetic acid is added to the 4,6-dienone compound obtained and the dithio-acetate is oxidized to yield β-(3-oxo-7α-acetylthio-17β-hydroxy-4-androstene-17α-yl)-propionic acid γ-lactone.

3. A process as claimed in claim 1, wherein the dehydrogenation reaction is carried out using chloranil and the oxidation reaction in the last step is carried out using chromium trioxide in acetone or glacial acetic acid.

4. A compound of the formula

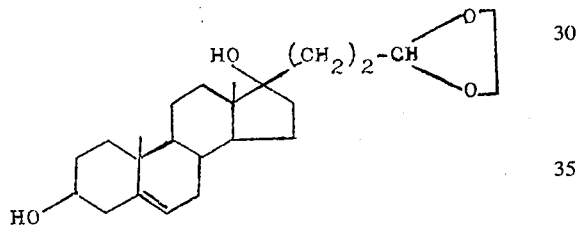

5. A compound of the formula

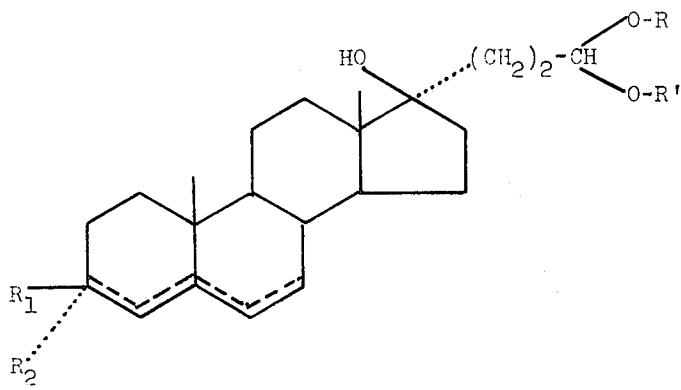

wherein the dashed lines represent a $\Delta^{3,5}$-, $\Delta^{5}$-, or $\Delta^{4,6}$-unsaturation and wherein $R_1$, taken alone, is —OH; $R_2$, taken alone, is hydrogen; $R_1$ and $R_2$, taken together, are ethylene dioxy, pyrrolidino, or lower alkoxy; R and R', taken alone, are the same or different and are alkyl having 1 to 10 carbon atoms; and R and R', taken together, are alkylene having 2 to 6 carbon atoms and are joined with the

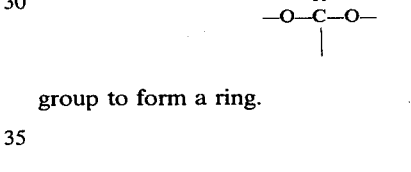

group to form a ring.

* * * * *